(No Model.)
J. H. THOMPSON.
HAND CULTIVATOR.
No. 290,142. Patented Dec. 11, 1883.
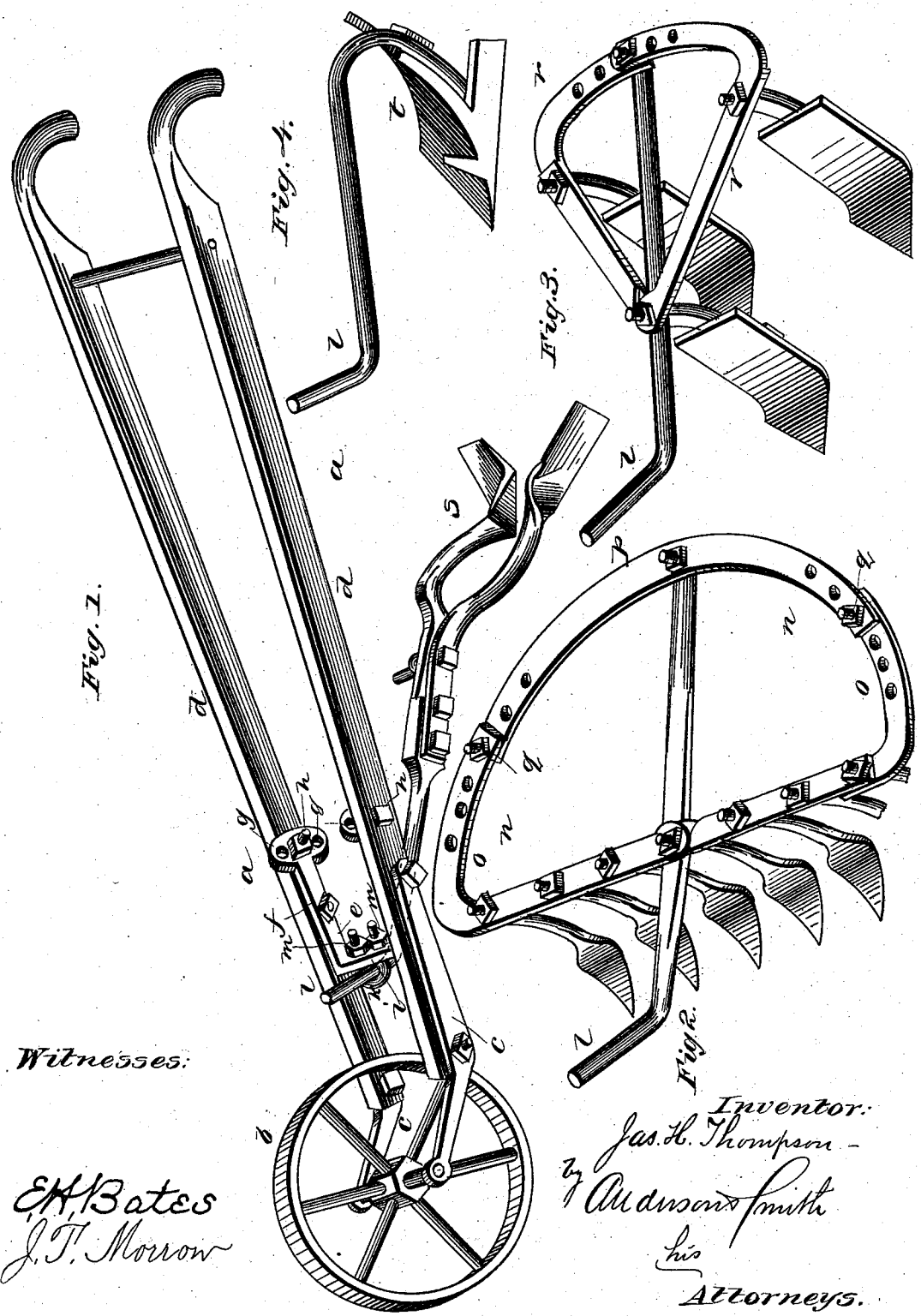
Witnesses:
E. H. Bates
J. T. Morrow
Inventor:
Jas. H. Thompson
by Anderson & Smith
his Attorneys.

UNITED STATES PATENT OFFICE.

JAMES H. THOMPSON, OF OMAHA, NEBRASKA.

HAND-CULTIVATOR.

SPECIFICATION forming part of Letters Patent No. 290,142, dated December 11, 1883.

Application filed June 4, 1883. (No model.)

*To all whom it may concern:*

Be it known that I, JAS. H. THOMPSON, a citizen of the United States, residing at Omaha, in the county of Douglas and State of Nebraska, have invented certain new and useful Improvements in Hand-Cultivators; and I do declare the following to be a full, clear, and exact description of the invention, such as will enable others skilled in the art to which it appertains to make and use the same, reference being had to the accompanying drawings, and to letters or figures of reference marked thereon. which form a part of this specification.

Figure 1 of the drawings is a perspective view of the cultivator. Figs. 2, 3, and 4 are perspective views of the attachments.

This invention has relation to hand-cultivators; and it consists in the construction and novel arrangement of parts, as will be hereinafter fully described, and particularly pointed out in the claim appended.

Referring by letter to the accompanying drawings, $a$ designates the cultivator-frame, having a single front supporting-wheel, $b$, working in bearings extending upwardly and forwardly from the side bars of the cultivator-frame. The bearing-irons $c$ are bolted to the outer sides of the side bars, $d$, and between these side bars, $d$, near their forward ends, is secured an adjustable angle-iron, $e$, having its rearwardly-extending arms $f$ provided with perforation $g$, through which the adjusting-bolts $h$ pass. The lateral bar $i$ of this angle-iron $e$ is perforated, and provided with an adjustable staple, $k$, by which the beams of interchangeable implements are attached to the cultivator-frame.

The main object of the cultivator-frame is to permit interchangeable implements to be attached and so adjusted out of line as to permit the soil to be upturned or operated upon, and at the same time permit the operator holding the handles of the frame to walk on the undisturbed soil.

The several attachments are provided with angular beams $l$, of round form, which are passed up through the staple and the nuts $m\,m$ tightened, to hold them to their angle of adjustment, which will be determined by the operator. In respect to the beam the attachments are all similar; in other respects they differ.

$n$ designates a cultivator for large plants. It has pivoted wings $o$ and a sectional arc, $p$, perforated for the reception of bolts $q$, by which it may be adjusted from a diametrical front to a receding radial front.

$r$ designates another attachment, provided with shovel-teeth for larger plants, which is also made laterally adjustable to suit the width between the plants.

$s$ designates a scraper, and $t$ is a plow-and-colter attachment by which matted beds of vines may be thinned out.

By the employment of the several interchangeable attachments, nearly all kinds of vegetables and vines can be cultivated.

Having thus fully described my invention, what I claim as new, and desire to secure by Letters Patent, is—

The combination, with a cultivator-frame having the front wheel combined with the angle-iron, of the perforated arms $f$ and the adjustable securing-staple $k$, adapted to receive interchangeably the various implements, substantially as specified.

In testimony whereof I affix my signature in presence of two witnesses.

JAMES H. THOMPSON.

Witnesses:
A. N. FERGUSON,
ALBERT SWARTZLANDER.